United States Patent [19]

Nowman

[11] Patent Number: 5,009,553

[45] Date of Patent: Apr. 23, 1991

[54] METHOD AND APPARATUS FOR DRILLING HARDPLATE

[76] Inventor: William G. Nowman, P.O. Box 2082, Camp Verde, Ariz. 86322

[21] Appl. No.: 364,268

[22] Filed: Jun. 9, 1989

Related U.S. Application Data

[63] Continuation-in-part of Ser. No. 75,515, Jul. 20, 1987, abandoned.

[51] Int. Cl.[5] .............................................. B23B 27/10

[52] U.S. Cl. ..................................... 408/1 R; 408/57; 408/145; 408/204

[58] Field of Search ................ 408/1, 203.5, 204, 207, 408/56, 57, 144, 147, 145; 83/22; 252/31, 56 R

[56] References Cited

U.S. PATENT DOCUMENTS

| | | | |
|---|---|---|---|
| 40,229 | 10/1863 | Balson | 252/56 R |
| 1,191,178 | 7/1916 | Harrison et al. | 252/56 R |
| 2,947,206 | 8/1960 | Flanagan | 408/1 |
| 2,991,243 | 7/1961 | Toulmin, Jr. | 83/22 |
| 2,996,061 | 8/1961 | Miller | 408/57 |
| 3,130,159 | 4/1964 | Stedt | 252/31 |
| 3,495,359 | 2/1970 | Smith et al. | 408/204 |
| 4,095,961 | 6/1978 | Wirth | 51/281 R |
| 4,383,785 | 5/1983 | Rice | 408/61 |
| 4,416,788 | 11/1983 | Apikos | 252/31 |
| 4,483,108 | 11/1984 | Howard | 408/145 |

*Primary Examiner*—Neil Abrams

*Attorney, Agent, or Firm*—William H. Drummond

[57] ABSTRACT

A rotatable cutter bit for drilling a hole in the hardplate of burglar-resistant safes includes an elongate hollow barrel having diamond grit bonded in a matrix to the periphery of the work-drilling end and a beeswax core in the hollow working end. A method for drilling hardplate includes the step of rotating a diamond-tipped drill bit in the hardplate in the presence of beeswax in the drilling interface.

2 Claims, 1 Drawing Sheet

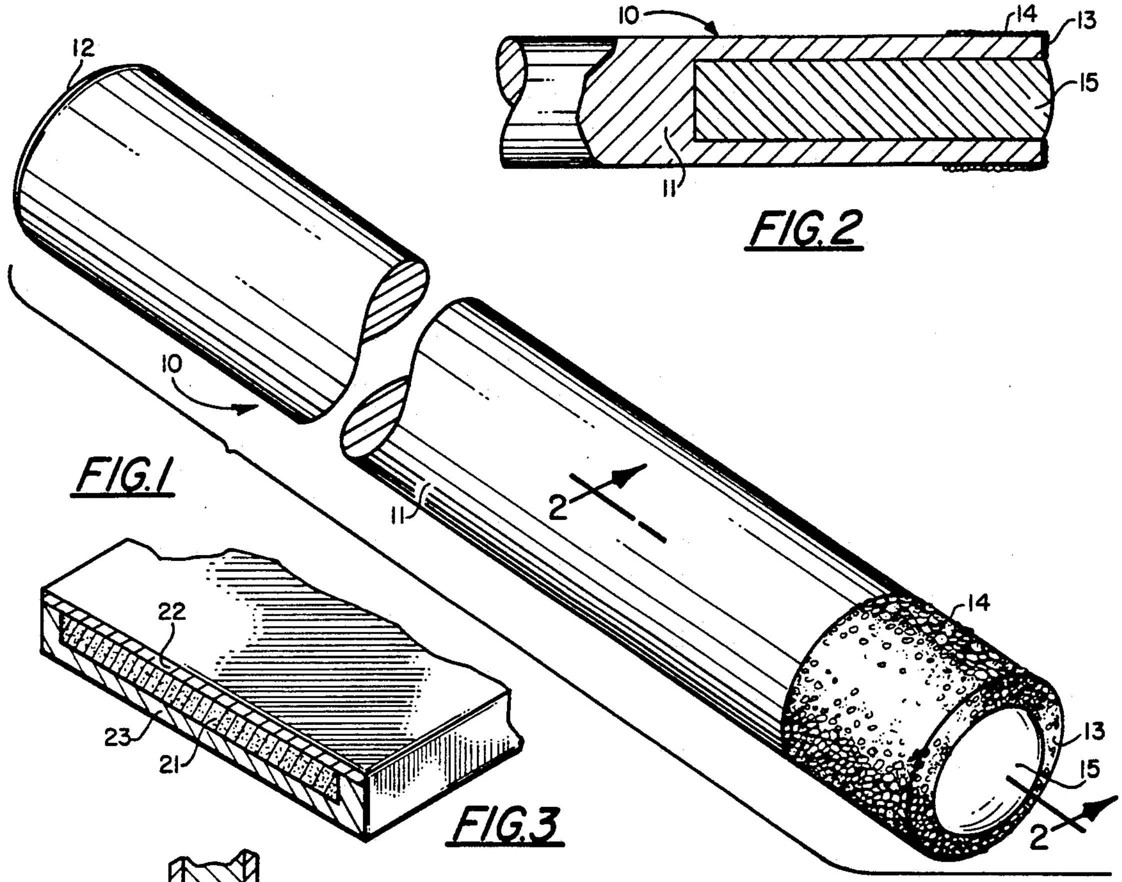
FIG. 2
FIG. 1
FIG. 3
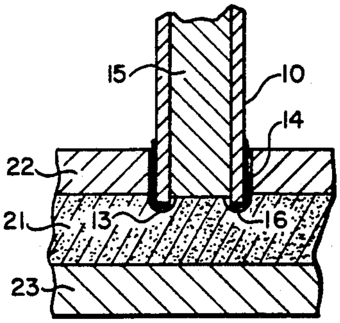
FIG. 4
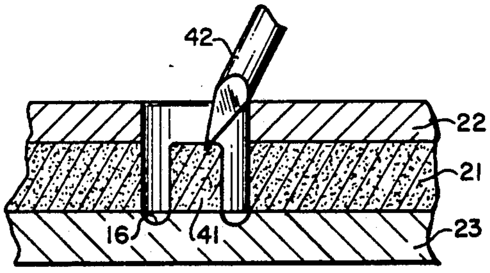
FIG. 6
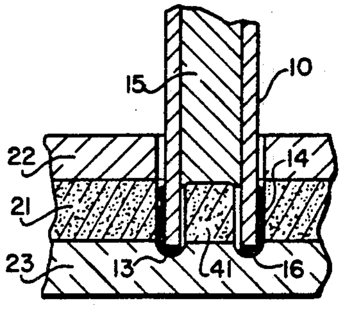
FIG. 5
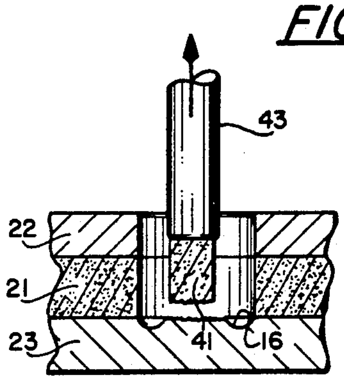
FIG. 7
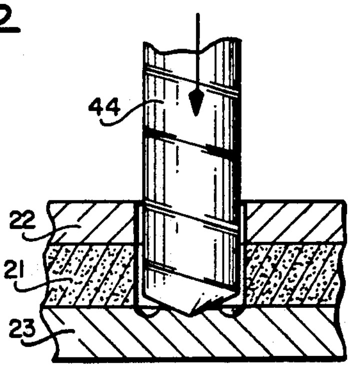
FIG. 8

METHOD AND APPARATUS FOR DRILLING HARDPLATE

This application is a continuation-in-part of application Ser. No. 075,515, filed Jul. 20, 1987 and now abandoned.

This invention relates to apparatus and methods for drilling "hardplate" of the type commonly employed in burglar-resistant safes.

More particularly, the invention relates to a rotatable cutter bit for performing this operation.

Even more particularly, the invention concerns apparatus and methods for drilling hardplate involving a special rotatable diamond-tipped cutter bit employed with provision to prevent occlusion of the diamond grit by the soft metal of the hardplate.

Burglar-resistant safes are commonly constructed of several layers of laminated plates of different materials which are chosen to frustrate conventional drilling methods. For example, in a typical burglar-resistant safe, the door is fabricated by pouring a melt of copper or other soft metal containing suspended chips of a harder metal, e.g., tungsten carbide, into a mild steel pan. The solidified melt (called "hardplate") is then sandwiched between layers of mild steel.

When drilled with conventional diamond-tipped bits, the soft metal of the hardplate occludes the diamond grit bonded to the tip of the drill, rendering them ineffective for further drilling the rough the carbide chips of the hardplate. The hardplate is conventionally located up to 2" inside the door to frustrate measures which would prevent such occlusion.

To facilitate drilling holes in the hardplate of a door of a burglar-resistant safe, it would be highly desirable to provide an apparatus and method which would prevent occlusion of the diamond grit bonded to a diamond-tipped drill by the soft metal matrix of the hard plate.

Therefore, the principal object of the present invention is to provide methods and apparatus for drilling hardplate with a diamond-tipped drill.

Yet another object of the invention is to provide such apparatus which is effective for this purpose.

Yet another object of the invention is to provide a method which is effective for this purpose.

Still another and further object of the invention is to provide such apparatus and methods whch employ conveniently available materials and which otherwise employ conventional bit-fabrication technology which is well-understood by persons skilled in this art.

These, and other, further and more specific objects and advantages of the invention will be best understood by reference to the drawings, in which:

FIG. 1 is a perspective view of a rotatable cutter but, fabricated in accordance with the present invention;

FIG. 2 is a sectional view of the cutter bit in FIG. 1;

FIG. 3 is a cut-away perspective view of a typical safe door fabricated as a laminate of "hardplate"with mild steel backings;

FIG. 4 is a sectional view illustrating the method of commencing the hardplate drilling operation using the cutter bit of FIGS. 1–2;

FIG. 5 illustrates a further progressive step in the cutting of the plate of FIG. 3 in which the bit of FIGS. 1–2 has penetrated to and slightly through the hardplate/mild steel interface;

FIG. 6 illustrates the step of removing the core of hardplate attached to the mild steel backing to expose the backing plate for further drilling;

FIG. 7 illustrates the condition of the safe door of FIG. 3 after removal of the hardplate core; and FIG. 8 illustrates the further drilling of the backing plate with a conventional carbide-tipped bit.

Briefly, in accordance with the invention, I provide apparatus and methods for drilling a hole in the hardplate of burglar-resistant safes.

The apparatus is a rotatable cutter bit, comprising an elongated barrel having an upper end, shaped and dimensioned to be received and retained in the chuck of a power drill and a lower hollow work-drilling end. Diamond grit is bonded in a matrix to the periphery of the work-drilling end. The interior of the hollow work-drilling end contains a beeswax core.

The method of the invention includes the step of rotating a diamond-tipped drill bit in the hardplate with beeswax in the drilling interface.

Turning now to the drawings, in which like reference numerals identify the same elements in the several views, FIGS. 1 and 2 depict the rotatable cutter bit, generally indicated by reference numeral 10 which comprises an elongated cylindrical barrel 11 having an upper end 12 which is shaped and dimensioned to be received in the chuck of a rotatable power drill (not shown) and a lower hollow end 13. Diamond grit 14 is bonded by art-recognized techniques to the periphery of lower end 13. The hollow interior of the lower end 13 is filled with a beeswax core 15.

A typical section of a laminate assembly representing a conventional burglar-resistant safe door is depicted in FIG. 3. The laminate consists of a hardplate core 21 sandwiched between front and rear laminates 22 and 23 of mild steel.

FIGS. 4–8 illustrate a drilling operation conducted in accordance with the presently preferred embodiments of the invention in which the drill of FIGS. 1–2 is used (FIGS. 4–5) to drill through the hardplate 21 of the laminate structure of FIG. 3, followed by removal of the hardplate core (FIGS. 6–7) and completion of the drilling by a conventional bit (FIG. 8).

At FIG. 4, it is assumed that the front plate 22 has been drilled by a conventional bit. At this point, the special bit of the invention 10 is inserted through the hole in plate 22 and drilling of the hardplate 21 is commenced (as shown in FIG. 4) until the bit 10 penetrates through the hardplate 21 and into the steel backing plate 23, as shown in FIG. 5.

At this point, the drill 10 is removed from the hole and the plug 41 of hardplate material remaining after advance of the hollow end 13 of the bit 10 through the work, is removed by any suitable technique. For example, as shown in FIG. 6, the plug 41 can be removed by tapping with a suitable chisel 42 to separate the plug 41 at its interface with the steel backing plate 23.

At this point, as shown in FIG. 7, the loosened plug 41 can be conveniently removed with a magnet 43 and, as shown in FIG. 8, drilling through the backing plate 23 can then be continued using a conventional carbide cutting bit 44.

As the cutting illustrated in FIGS. 4–5 proceeds, the beeswax core 15 melts and enters the drilling interface 16 and prevents the soft metal of the hardplate 21 from clogging or occluding the diamond grit 14 on the periphery of the lower end 13 of the bit 10. If the bit 10 is withdrawn during step 4, additional beeswax should be used to fill the hollow end 13 of the bit 10 so as to always maintain beeswax in the cutting interface 16.

The exact mechanism by which the beeswax prevents the occlusion of the diamond grit is not completely understood. However, it is believed that the beeswax, because of its ability to adhere or "wet" both hot and cold surfaces, prevents "galling" of the copper matrix of the hardplate. It is presently believed that synthetic materials can be formulated which possess similar properties, but research and development has not proceeded to the point that such can be identified at present. On the other hand, a wide variety of other common lubricants such as petroleum jelly, machine cutting oils and the like, have been investigated and do not perform the function of beeswax.

In order to quantify the efficacy of the beeswax over other materials, the following experiments were conducted in which Maxaloy "E" hardplate was drilled. This particular hardplate consists of a sheet metal enclosed 7/16" thick plate of copper alloy in which large carbide chips have been imbedded.

The core drills used were fabricated from 4130 chrome-moly alloy with diamond chips bonded to the base metal by electro plating.

| Lubricant | Drilling time | Result |
|---|---|---|
| None | 10 minutes | Bit galled & quit cutting |
| Johnson's Paste Wax | 7 minutes | Bit galled & quit cutting; lost all lubricant due to heat |
| Paraffin | 15 minutes | Bit galled & quit cutting; lost all lubricant due to heat |
| Lithium Grease | 8 minutes | Bit galled & quit cutting |
| Cutting Oil | Nil* | Always unsuccessful due to difficulty of getting lubricant to the cutting surface |
| Beeswax | 19 minutes | Penetrated plate |

*It was not possible to drill with cutting oil at the drilling interface because the interface is well below the surface of the hardplate.

*It was not possible to drill with cutting oil at the drilling interface because the interface is well below the surface of the hardplate.

Under similar conditions, a beeswax lubricated drill bit is capable of penetrating 3/8" thick Diebold hardplate, which consists of large carbide chips embedded in stainless steel and enclosed in a stainless steel case, in about 13 minutes. Mosler carbide hardplate, which consists of small carbide chips applied to the surface of a 1/2" thick hard steel plate using a welding process, can be penetrated in about 45 minutes with a beeswax lubricated drillbit.

Having described my invention in such terms as to enable those skilled in the art to understand and practice it and, having identifed the presently preferred embodiments therof, I claim:

1. A rotatable cutter bit for drilling a hole in the hardplate of burglar-resistant safes, said hardplate including metal carbide chips embedded in a softer metal said cutter bit comprising:

(a) an elongate barrel having i. an upper end, shaped and dimensioned to be received and retained in the chuck of a power drill, and ii. a lower hollow work-drilling end;

(b) diamond grit bonded in a matrix to the periphery of said work-drilling end, and (c) an anti-occlusion core in said hollow work-drilling end, said core consisting essentially of beeswax.

2. In a method for drilling a hole in the hardplate of a burglar-resistant safe, the step of rotating a diamond-tipped drill bit in said hardplate with a composition consisting essentially of beeswax in the drilling interface.

* * * * *